United States Patent [19]

Ogawa

[11] Patent Number: 4,491,094
[45] Date of Patent: Jan. 1, 1985

[54] VACUUM PUMP-RADIATOR FAN DRIVE SYSTEM

[75] Inventor: Hitoshi Ogawa, Himeji, Japan

[73] Assignee: Mitsubishi Denki Kabushiki Kaisha, Tokyo, Japan

[21] Appl. No.: 476,962

[22] PCT Filed: Aug. 18, 1982

[86] PCT No.: PCT/JP82/00322
§ 371 Date: Mar. 17, 1983
§ 102(e) Date: Mar. 17, 1983

[87] PCT Pub. No.: WO83/00667
PCT Pub. Date: Mar. 3, 1983

[30] Foreign Application Priority Data

Aug. 18, 1981 [JP] Japan .............. 56-122893[U]

[51] Int. Cl.³ ............................................. F01P 5/04
[52] U.S. Cl. .............................. 123/41.49; 123/41.55
[58] Field of Search ................... 123/41.46, 41.49; 417/74

[56] References Cited

U.S. PATENT DOCUMENTS 2,019,476 11/1935 Brownlee ............... 123/41.46
2,409,477 10/1946 De Lancey ............... 417/199

FOREIGN PATENT DOCUMENTS 53-658 1/1978 Japan .
53-26249 8/1978 Japan .
53-114510 10/1978 Japan .
55-175560 12/1980 Japan .

OTHER PUBLICATIONS

*Mechanism*, published on Apr. 30, 1967, pp. 486–487.

Primary Examiner—William A. Cuchlinski, Jr.
Attorney, Agent, or Firm—Wenderoth, Lind & Ponack

[57] ABSTRACT

The present invention relates to improvements in a vacuum pump used with a driving source for a brake for a vehicle or the like and is a vacuum pump having a rotor (4) thereof mounted to a rotatary shaft (22) of an electric motor for driving a fan (29) for cooling a radiator (31) while consisting of a housing consisting of a inner cylindrical peripheral surface eccentric from the center of the rotor, a plate (6) constituting an operating chamber with this housing, and vanes mounted to the rotor and provided within the housing.

1 Claim, 4 Drawing Figures

VACUUM PUMP-RADIATOR FAN DRIVE SYSTEM

TECHNICAL FIELD

This invention relates to a drive system for a vacuum pump for a vehicular brake means and for a radiator cooling fan.

BACKGROUND ART

A vacuum pump has previously been disposed on the rear end portion of the electric generator for motor vehicles and the construction thereof will be described in conjunction with FIGS. 1 and 2.

A rear bracket (1) for an electric generator used with a motor vehicle supports a shaft (2) in a bearing (3) and the shaft is driven by an engine not shown. A rotor (4) is mounted to said shaft (2) by the spline fitting. A housing (5) has an inner cylindrical peripheral surface eccentric from the centers of said shaft (2) and said rotor (4), and a plate (6) closes the end of said housing (5) facing said rear bracket (1) and with said housing (5) forms a pump operating chamber (7). A mounting bolt (8) fixes said housing (5) and said plate (6) to said rear bracket (1). Vanes (9) are radially slidably mounted on said rotor (4). Packings (10) and (11) are provided for sealing the junctions between said rear bracket (1) and the plate (6) and between said plate (6) and the housing (5). An oil seal (12) is fixed to said bracket (1) and contacts the periphery of said shaft (2) to maintain the airtightness of the pump operating chamber (7). A suction port (13), an exhaust port (14) and an oil supply port (15) are provided in said housing (5) and connected to a vacuum tank (or a pressure accumulating portion of a master cylinder), an oil pan and an oil pump respectively, none of which are shown.

A rotor (16) of the generator is fixed to the shaft (2) and a stator (17) holds an armature winding therefor. A front bracket (18) is provided and together with the rear bracket (1) constitutes the outer frame of the electric generator and a bearing (19) is fixed to this front bracket (18) and rotatably journals the shaft (2). A pulley (20) is fixed to the shaft (2) and is driven by a belt, not shown, from the engine.

The operation will now be described:

First with respect to the vacuum pump, when the rotation of the engine is transmitted to the pulley (2) by a belt to rotate the shaft (2) in the direction of the arrow, the vanes (9) slide outward due to centrifugal force on the vanes and the outer ends slide along the inner wall of the housing (5) performing a pumping operation to suck air from within the vacuum tank (or the pressure accumulating portion of the master cylinder) and exhaust it through the exhaust port (14). Also oil supplied to the interior of the housing (5) through the oil supply port (15) effects the lubrication of the sliding surfaces of the vanes (9) and the rotor (4) and is exhausted to the oil pan through the exhaust port (14).

With respect to the electric generator, an alternating current is induced on the stator by the magnetic field generated from the rotor (16) during the rotation of the shaft (2). This alternating current is rectified to a direct current which flows into a charging circuit for the motor vehicle.

The electric generator for motor vehicles is generally belt-driven by the engine at a speed of rotation equal to about twice that of the engine in view of the power generation characteristic thereof. The vacuum pump directly connected to the generator also rotates at the same speed as the generator. For this reason, it is operates with abrupt acceleration and deceleration from a range of low speed of rotation (about 1000 rpm) to a range of high speed rotation (about 12000 rpm) and also the vacuum pump is continually being operated during the operation of the engine. Thus the components constituting the vacuum pump have previously been required to have durability and shock resistance so as to be able to rotate high rotation speeds and provide long service, resulting in an expensive device. Also since the electric generator is driven through the belt there has been the disadvantage that a vacuum can not be obtained when the belt is broken and the vacuum pump is stopped.

DISCLOSURE OF THE INVENTION

The present invention relates to a drive system for a radiator fan and a vacuum pump which permits use of a vacuum pump which does not require the durability and shock resistance such as those of conventional vacuum pumps. The drive system has a vacuum pump connected to an electric motor for cooling a radiator and continually or intermittently operating at a constant speed of rotation, which makes it possible to use a vacuum pump which is cheap and also has high in reliability because it is directly driven by the electric motor rather than a belt.

BEST MODE FOR CARRYING OUT THE INVENTION

Figure 1:
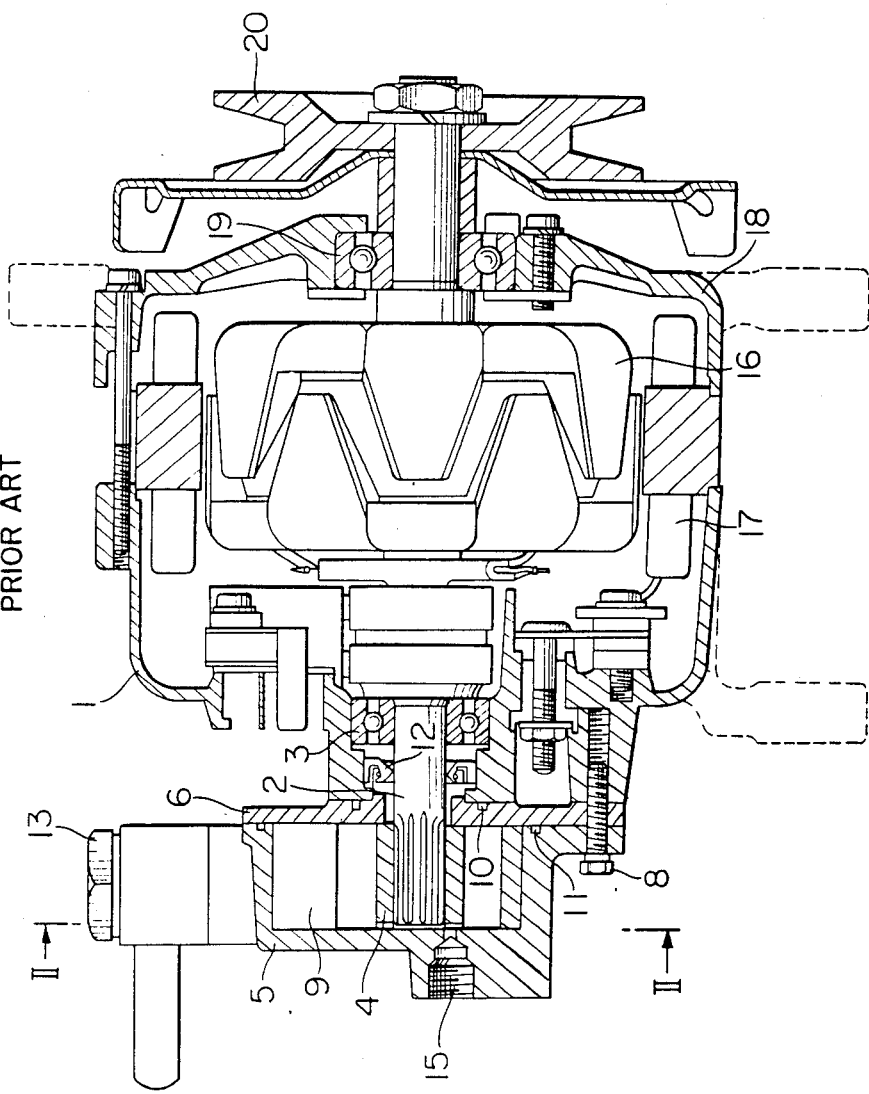
FIG. 1 is a sectional view illustrating a conventional vacuum pump and generator.
Figure 2:
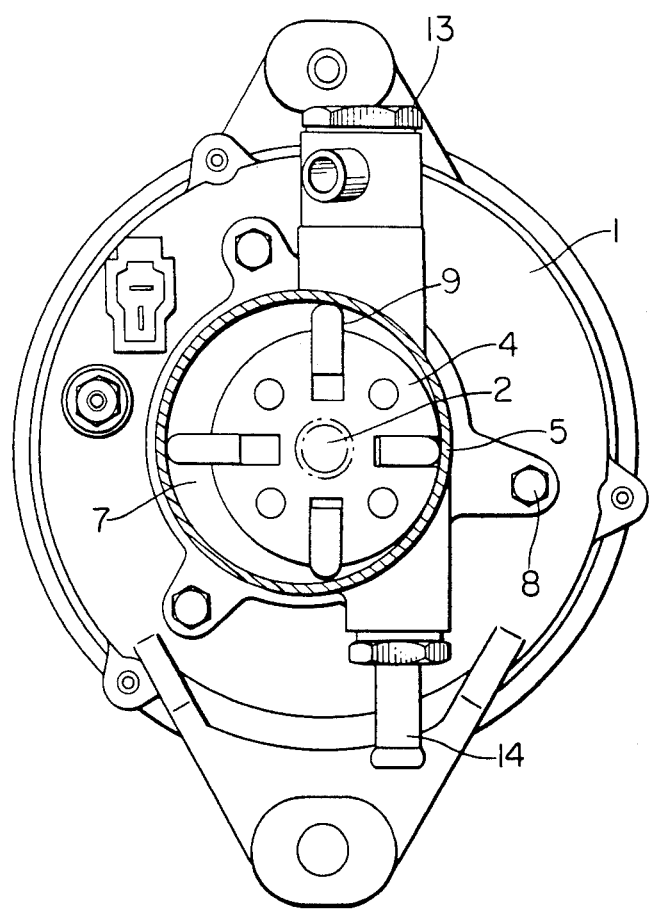
FIG. 2 is a sectional view along the line II—II of FIG. 1.
Figure 3:
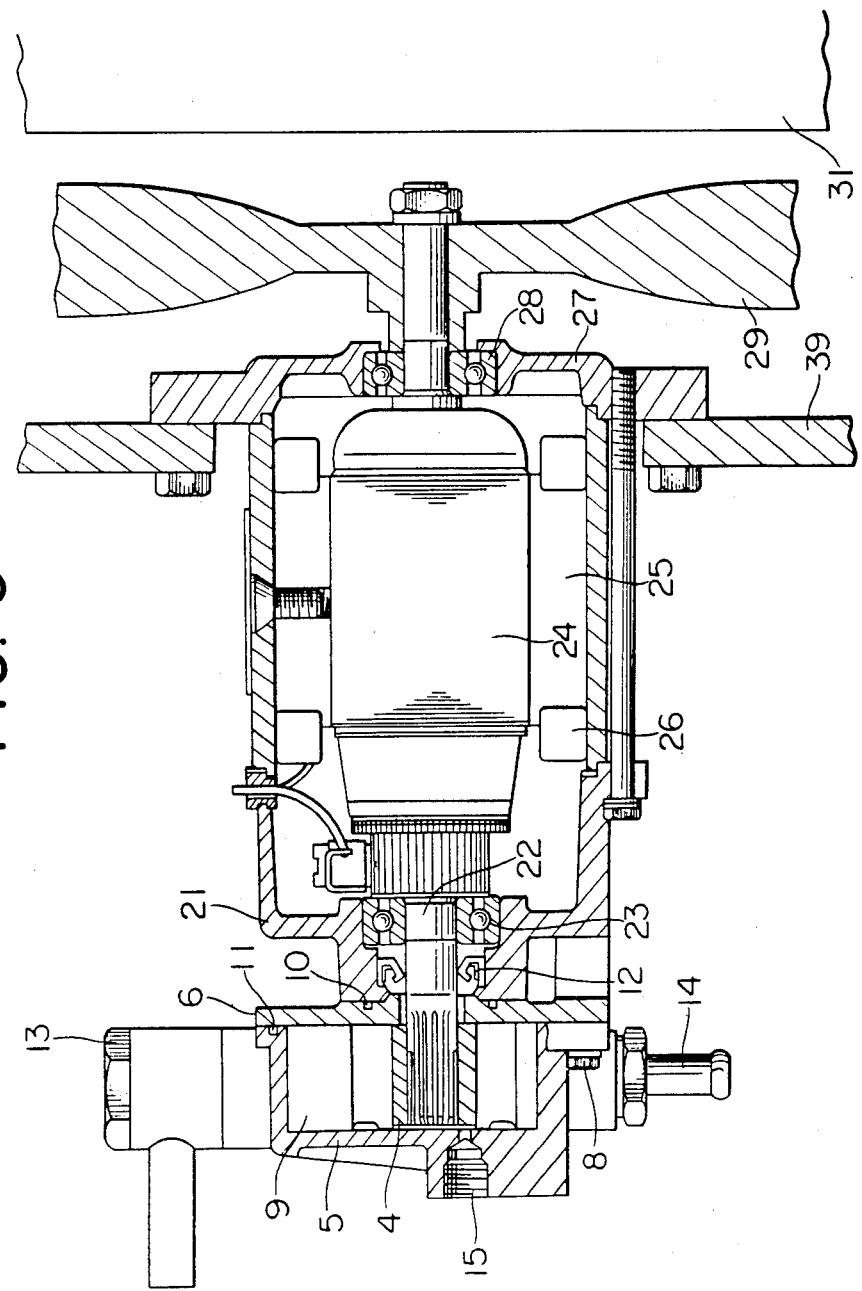
FIG. 3 is a sectional view illustrating one embodiment of the present invention.
Figure 4:
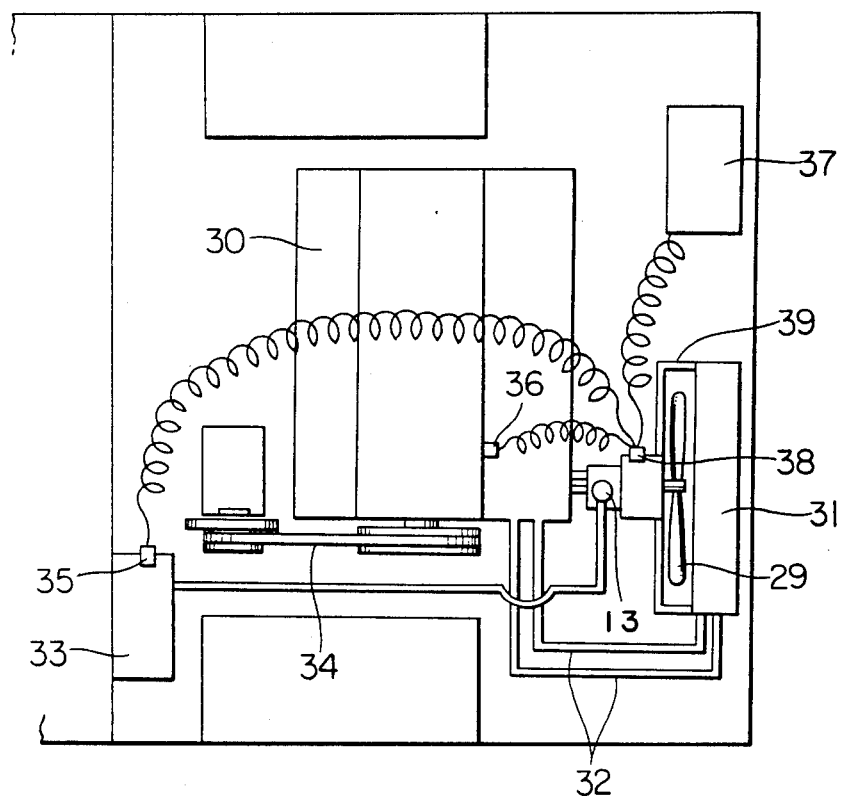
FIG. 4 is a plan view of an engine space of a motor vehicle including this one embodiment.

One embodiment of the present invention will hereinafter be described with reference to FIGS. 3 and 4. A rear bracket (21) of an electric motor has a shaft (22) rotatably journalled in a bearing (23) therein. Fixed to this shaft (23) is an armature (24). A field iron core (25) is provided around to this armature, and a field winding (26) is wound on the field iron core. A front bracket (27) has a bearing (28) fixed thereto which rotatably journals said shaft (23). A fan (29) is fixed to the shaft (23). A vacuum pump having essentially the same structure as that shown in FIGS. 1 and 2 is attached to said rear bracket 21 by mounting bolt (8) and has the rotor (4) mounted on the splined rear end of the motor shaft (22). Since the pump structure is the same, it will not be repeated here. An engine (30) and has a radiator (31) connected to the cooling system thereof for cooling this engine. Hoses (32) are connected between the two for conducting the cooling fluid for the engine (30) therebetween. A vacuum tank (33) (or a pressure accumulating portion of a master cylinder) holds a vacuum generated by the vacuum pump. A hose (34) is connected to a suction port (13) of the vacuum pump. Sensors (35) and (36) are provided, one of the sensors (35) being connected to the vacuum tank (33) (or the pressure accumulating portion of the master cylinder) while the other of the sensors (36) is connected for being capable of sensing the temperature of the cooling fluid for the engine (30). A battery (37) is provided. The sensors (35) and (36) and the battery (37) are connected to a switch (38) for turning the electric motor on and off. A frame (39) fixes the radiator (31) to the front bracket (27) of the electric motor.

By closing the switch (38), current from the battery 37 flows through the armature (24) and the field winding (26) to rotate the armature (24), and by opening the switch (38), it is stopped. The opening and closing of the switch (38) is controlled by the sensors (35) and (36). The sensor (35) senses the temperature of the cooling water and upon a predetermined temperature being reached, it opens or closes the switch (38) to effect the cooling of the radiator (31). At the time the rotor (4) of the vacuum pump is simultaneously rotated and therefore a pumping operation is also performed.

The sensor (38) senses the degree of vacuum in the vacuum tank (33) (or the pressure accumulating portion of the master cylinder) and upon a predetermined degree of vacuum being reached, it opens or closes the switch (38) to drive the vacuum pump to perform the pumping operation. A that time, the fan (29) is also simultaneously rotated and therefore effects also the cooling of the radiator (31).

Also it is possible to continually rotate the electric motor to rotate the fan and to perform the pumping operation as the case may be.

While the rear bracket (21) and the plate (6) have been shown as separate members in said embodiment, the formation of the two as a single member gives a similar effect. Also, while in said embodiment a description has been given of an oil lubrication system vacuum pump, the use of a non-lubrication system vacuum pump gives a similar effect.

Furthermore while the shaft 22 is directly fitted into the rotor (4) a similar effect is given by driving the rotor (4) through a coupling interposed between the shaft (22) and the rotor (4).

I claim:
1. A radiator cooling fan and vacuum pump system for a motor vehicle comprising:
   a vacuum holding means;
   an electric motor having a rear bracket forming part of a motor housing and having a rotary shaft;
   a fan for cooling a radiator mounted on one end of said rotary shaft;
   a vacuum pump rotor mounted on the other end of said rotary shaft;
   a vacuum pump housing within which said rotor is rotatably mounted and having an inner cylindrical surface eccentric from the axis ofrotation of said rotor on said rotary shaft and having a suction port connected to said vacuum holding means and an exhaust port;
   a housing closure on the end of said housing facing said motor and closing the interior of said housing and mounted on said rear bracket;
   vanes slidably mounted in said rotor for sliding in diametrical directions of said rotor and having the radial outer ends in contact with the inner cylindrical surface of said housing for pumping the coolant for the engine of the motor vehicle from said suction port to said exhaust port;
   motor switch means for turning said motor on and off;
   coolant temperature sensing means for sensing the temperature of the coolant and connected to said motor switch means for causing said motor switch means to turn said motor or when said temperature reaches a predetermined temperature; and
   vacuum sensing means for sensing the degree of vacuum in said vacuum holding means and connected to said motor switch means for causing said motor switch means to turn said motor on when the degree of vacuum in said vacuum holding means reaches a predetermined value.

* * * * *